United States Patent
Zhu et al.

(10) Patent No.: US 11,386,496 B2
(45) Date of Patent: Jul. 12, 2022

(54) GENERATIVE NETWORK BASED PROBABILISTIC PORTFOLIO MANAGEMENT

(71) Applicant: International Business Machines Corporation, Armonk, NY (US)

(72) Inventors: Yada Zhu, Irvington, NY (US); Giovanni Mariani, Amsterdam (NL); Kumar Bhaskaran, Englewood Cliffs, NJ (US); Rong N. Chang, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 16/523,546

(22) Filed: Jul. 26, 2019

(65) Prior Publication Data

US 2021/0027379 A1    Jan. 28, 2021

(51) Int. Cl.
| | | |
|---|---|---|
| *G06Q 20/00* | (2012.01) | |
| *G06Q 40/06* | (2012.01) | |
| *G06F 16/904* | (2019.01) | |
| *G06N 3/04* | (2006.01) | |

(52) U.S. Cl.
CPC .......... *G06Q 40/06* (2013.01); *G06F 16/904* (2019.01); *G06N 3/0454* (2013.01)

(58) Field of Classification Search
None
See application file for complete search history.

(56) References Cited

U.S. PATENT DOCUMENTS

| | | | |
|---|---|---|---|
| 7,536,332 B2 | 5/2009 | Rhee | |
| 8,296,221 B1* | 10/2012 | Waelbroeck | G06Q 40/04 |
| | | | 705/37 |
| 2005/0090911 A1* | 4/2005 | Ingargiola | G06Q 40/00 |
| | | | 700/36 |
| 2006/0089892 A1* | 4/2006 | Sullivan | G06Q 40/06 |
| | | | 705/35 |

(Continued)

FOREIGN PATENT DOCUMENTS

CN    108596769 A    9/2018

OTHER PUBLICATIONS

Sengupta, R. N., et al., "Robust and Reliable Portfolio Optimization Formulation of a Chance Constrained Problem", Foundations of Computing and Decision Sciences, Mar. 2017, pp. 83-117, vol. 42, No. 1.

(Continued)

*Primary Examiner* — Narayanswamy Subramanian
*Assistant Examiner* — Bhavin D Shah
(74) *Attorney, Agent, or Firm* — Scully, Scott, Murphy & Presser, P.C.; Daniel P. Morris

(57) ABSTRACT

A deep-learning neural network can be trained to model a probability distribution of the asset-price trends for a future time period using a training data set, which can include asset-price trends of a plurality of assets over a past time period and a latent vector sampled from a prior distribution associated with the asset-price trends of a plurality of assets. The training data set can represent a time series data. A portfolio optimization can be executed on the modeled probability distribution to estimate expected risks and returns for different portfolio diversification options.

14 Claims, 14 Drawing Sheets

(56) References Cited

U.S. PATENT DOCUMENTS

| | | | |
|---|---|---|---|
| 2009/0043637 A1* | 2/2009 | Eder | G06N 20/00 705/37 |
| 2014/0317019 A1* | 10/2014 | Papenbrock | G06Q 40/06 705/36 R |
| 2015/0324918 A1 | 11/2015 | Ward | |
| 2016/0132968 A1 | 5/2016 | Ayal | |
| 2018/0232810 A1 | 8/2018 | Heinze | |
| 2019/0080206 A1* | 3/2019 | Hotson | G06K 9/00798 |
| 2019/0108448 A1* | 4/2019 | O'Malia | G06N 3/04 |
| 2020/0250574 A1* | 8/2020 | Khazane | G06N 3/0454 |
| 2020/0302309 A1* | 9/2020 | Golding | G06N 20/00 |

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.

Deng, Y., et al., "Deep Direct Reinforcement Learning for Financial Signal Representation and Trading", IEEE Transactions on Neural Networks and Learning Systems, Mar. 2017, pp. 653-664, vol. 28, No. 3.

Jiang, Z., et al., "A Deep Reinforcement Learning Framework for the Financial Portfolio Management Problem", arXiv:1706.10059v2, Jul. 16, 2017, 31 pages.

Almahdi, S., et al., "An adaptive portfolio trading system: A risk-return portfolio optimization using recurrent reinforecement learning with expected maximum drawdown", Expert Systems With Applications, Received Mar. 24, 2017, Revised May 29, 2017, Accepted Jun. 14, 2017, Available online Jun. 15, 2017, pp. 267-279, vol. 87.

Goodfellow, I., et al., "Generative Adversarial Nets", arXiv:1406.2661v1, Jun. 10, 2014, 9 pages.

Mogren, O., "C-RNN-GAN: Continuous recurrent neural networks with adversarial training", arXiv:1611.09904v1, Nov. 29, 2016, 6 pages.

Hyland, S.L., et al., "Real-valued (medical) time series generation with recurrent conditional gans", arXiv:1706 02633v2, Dec. 4, 2017, 13 pages.

Zhou, X., et al., "Stock Market Prediction on High-Frequency Data Using Generative Adversarial Nets", Mathematical Problems in Engineering, Received Nov. 6, 2017, Revised Jan. 21, 2018, Accepted Feb. 13, 2018, Published Apr. 15, 2018, 12 pages, vol. 2018.

Sheta, A.F., et al., "A Comparison Between Regression, Artificial Neural Networks and Support Vector Machines for Predicting Stock Market Index", International Journal of Advanced Research in Artificial Intelligence, Jul. 2015, pp. 55-63, vol. 4, No. 7.

Ding, X., et al., "Deep Learning for Event-Driven Stock Prediction", Proceedings of the Twenty-Fourth International Joint Conference on Arlilicial Intelligence (IJCAI 2015), Jul. 2015, pp. 2327-2333.

Kuremoto, T., et al., "Time Series Forecasting Using a Deep Belief Network with Restricted Boltzmann Machines", Neurocomputing, Aug. 2014, 27 pages.

Bao, W., et al., "A deep learning framework for financial time series using stacked autoencoders and long-short term memory", PLoS ONE, Received Dec. 20, 2016, Accepted Jun. 10, 2017, Published Jul. 14, 2017, pp. 1-24, vol. 12, No. 7.

Gulranjani, I., et al., "Improved Training of Wasserstein GANs", arXiv:1704.00028v3, Dec. 24, 2017, 20 pages.

Miyato, T., et al., "Spectral Normalization for Generative Adversarial Networks", arXiv:1802.05957v1, Feb. 16, 2018, 26 pages.

Brock, A., et al., "Large Scale GAN Training for High Fidelity Natural Image Synthesis", arXiv:1809.11096v2, Feb. 25, 2019, 35 pages.

Huang, W.., et al., "Forecasting stock market movement direction with support vector machine", Computers & Operations Research, Accepted Mar. 29, 2004, pp. 2513-2522, vol. 32, No. 10.

* cited by examiner

GENERATIVE NETWORK BASED PROBABILISTIC PORTFOLIO MANAGEMENT

BACKGROUND

The present application relates generally to computers and computer applications, and more particularly to machine learning and prediction model. Machine learning algorithms can be implemented to predict or forecast data in many different domains. However, in areas in which future prediction is driven by uncertainty, some algorithms may lag in their abilities to provide accurate predictions.

BRIEF SUMMARY

A computer-implemented method and system may be provided. The method, in one aspect, may include creating a training data set including at least asset-price trends of a plurality of assets over a past time period and a latent vector sampled from a prior distribution associated with the asset-price trends of a plurality of assets, wherein the training data set includes a time series data. The method may also include training a deep-learning neural network to model a probability distribution of the asset-price trends for a future time period using the training data set. The method may further include executing a portfolio optimization on the modeled probability distribution. The method may also include estimating expected risks and returns for different portfolio diversification options based on the portfolio optimization.

A system, in one aspect, may include a hardware processor. A memory device may be coupled with the hardware process. The hardware processor operable to create a training data set including at least asset-price trends of a plurality of assets over a past time period and a latent vector sampled from a prior distribution associated with the asset-price trends of a plurality of assets, wherein the training data set includes a time series data. The hardware processor may be further operable to train a deep-learning neural network to model a probability distribution of the asset-price trends for a future time period using the training data set. The hardware processor may be further operable to execute a portfolio optimization on the modeled probability distribution. The hardware processor may be further operable to estimate expected risks and returns for different portfolio diversification options based on the portfolio optimization.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1A:
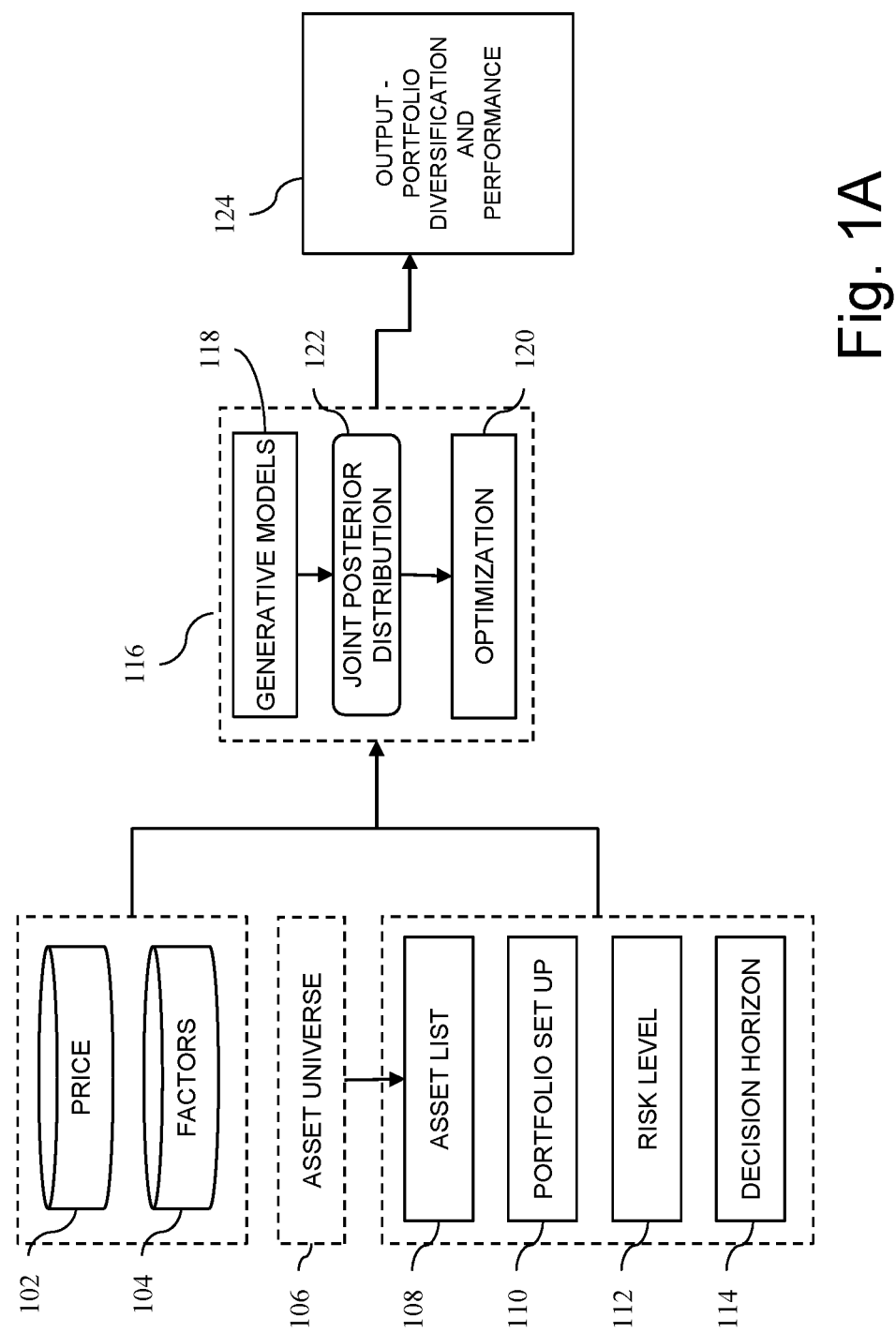
FIG. 1A is a diagram illustrating a flow in a method in one embodiment.

A system, method and technique may be provided, which can generate and train a generative network, for example, a generative adversarial network (GAN). In an embodiment, the generative network is built and trained to learn the future market uncertainty in its multidimensional form for portfolio diversification. The generative network can allow for diversified portfolio combination with a risk adjusted return. For instance, a generative network model can be trained to directly model the market uncertainty, a factor driving future price trend in multidimensional form, such that the nonlinear interactions between different assets can be embedded in a generative network. In an embodiment, the generative network models the market uncertainty conditioned with the most recent past, allowing the generative network to automatically learn nonlinear market behavior and non-linear dependencies between different financial assets. The generative network may generate realistic future trends given current situation. In an embodiment, the generative network is trained based on real time series data.

An optimization methodology can utilize the probability distribution of real market trends learnt during the generative network training to determine a portfolio diversification minimizing the risk and maximizing the expected returns observed over the execution of multiple market simulations. An optimization methodology may use the generative network model to solve a portfolio diversification problem. A probability distribution learnt by the generative network model allows a user to apply and analyze different diversification options to trade off risk for expected returns. Given a target user-selected risk level, a system, method and technique may provide a diversification to be implemented, which realizes an optimal point on the predicted risk-return efficient frontier, for example, a point at which risk and return are balanced.

The system, method and technique may also provide a graphical user interface (GUI) allowing a user to perform analysis with the generative network, for example, based on selecting various input parameters such as assets, strategy, constraints, target risk level and decision horizon. The GUI can present an output of the generative network which may include, but not limited to, capital allocation for each asset, return-risk efficient frontier, diversification mp, Sharpe ratio.

In an embodiment, the generative network need not rely on any preliminary assumption about the probability distribution of individual asset returns. In an embodiment, the non-linearity of the neural network implicitly embeds non-linear interactions between different assets. In an embodiment, the generative network can be explicitly designed to take as input the current market situation and to model the future probability distribution of returns.

An example of a generative network is generative adversarial network (GAN). GAN includes two networks training simultaneously. The discriminative network D learns to distinguish whether a given data instance is real or not, and a generative network G learns to confuse D by generating high quality data. The discriminative and generative networks can include deep learning networks. Computer vision and natural language processing techniques may utilize GAN. A specific example use of GAN can include generating image patches from random noise using such networks training simultaneously.

A system, method and technique, in embodiments, may implement a GAN framework for continuous time series data. In an embodiment, the GAN framework includes deep-learning networks for time series data. Such implementation of the GAN can enable the GAN to perform asset portfolio analysis. For instance, stock price can largely be driven by the fundamental performance of an individual company and the dynamic interactions of different stocks are embedded in their prices. A system, method and technique, in embodiments, can implement a GAN, which can provide the capability of simulating possible future situations by sampling future prices from a posteriori probability distribution learnt with the adversarial training process. For instance, in an embodiment, the GAN is implemented to learn to model the uncertainty of the marketplace in its sophisticated multidimensional form.

FIG. 1A is a diagram illustrating a flow in a method in one embodiment. The method can be applied to asset price 102 and/or factors 106 such as momentum, profitability, leverage, and/or others. An asset universe 106 provides all the candidate assets for constructing a portfolio. An asset list 108 includes selected assets in a portfolio. Portfolio set up 110 can be a user selected decision parameter, which provides all the parameters to determine the optimal portfolio diversification. Risk level 112 can be another user selected decision parameter, which specifies a level of risk. For example, the system can allow a user to adjust the risk level and see how the returns, diversification and portfolio performance can change based on different risk levels, which can be selected. Decision horizon 114 can be yet another user selected decision parameter, and specifies or indicates how many days ahead, e.g., 5 days, 10 days or 20 days, or another period, for the study or evaluation.

A learning engine 116 can include a generative model 118 and optimization algorithm or component 120. The generative model 118 learns the underlying market behaviors and its uncertainty generating process via collecting past data and trains a model to generate data mimicking it in the future with latent uncertainty factors. Examples of the generative model 118 can be, but are not limited to GAN, a variation of GAN, variational autoencoder, and Pixel RNN for sequence data. The generative model 118 outputs a learnt joint probability distribution 122, for example, of input price 102 or factor 104. In an aspect, the dependency between assets is not linear.

The optimization component 120 may include a portfolio optimization formulation. For example, the optimization can include solving an optimization problem (e.g., a portfolio diversification problem) using an algorithm such as, but not limited to, a heuristic algorithm, e.g., generic algorithm.

Figure 1B:
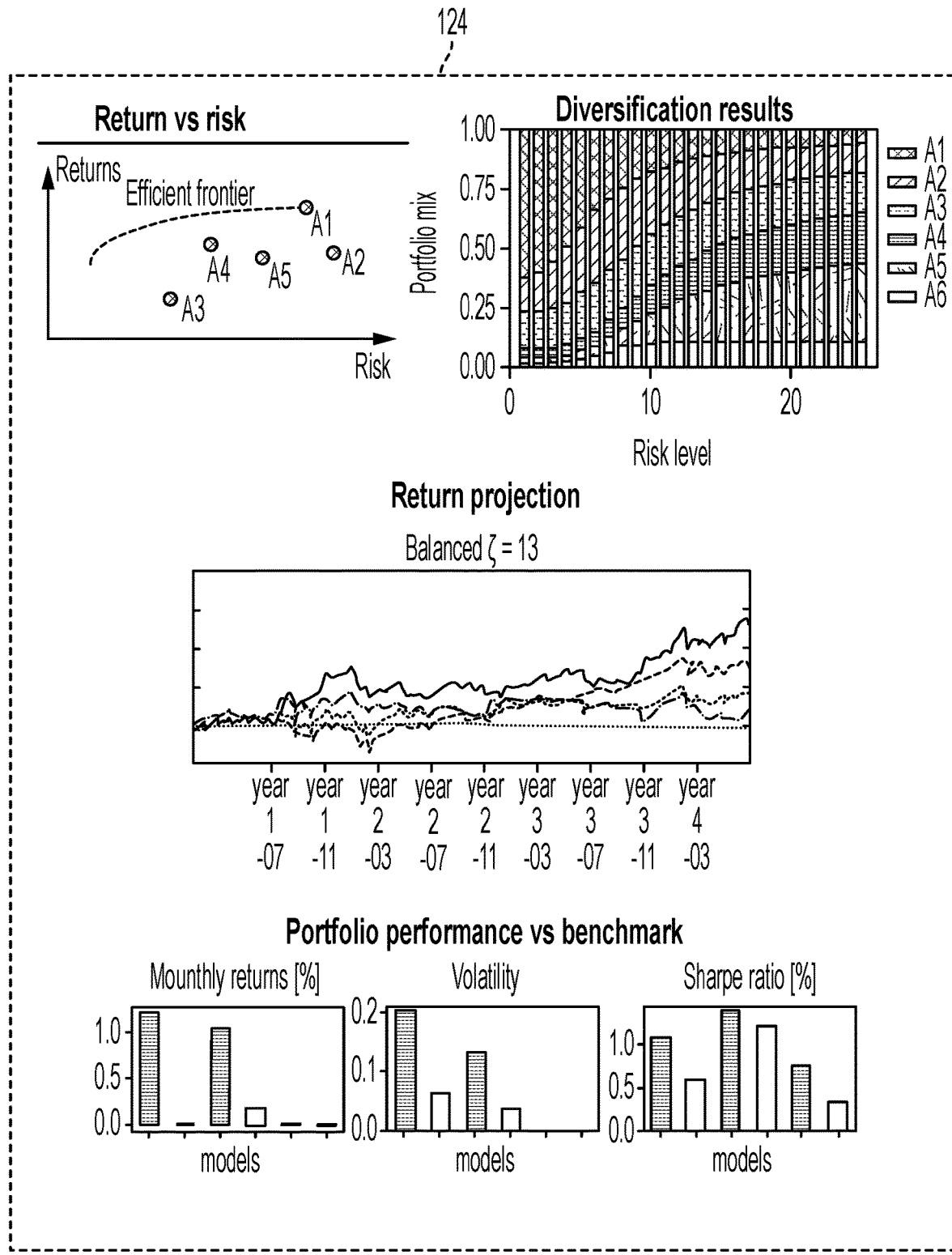
FIG. 1B illustrates an example of portfolio diversification and performance data output by a learning engine, which can be visualized, for example, on a graphical user interface, in an embodiment.

The learning engine 116 produces output 124, which can include a portfolio diversification and performance data, for example, which can be visualized for example, as shown in FIG. 1B. FIG. 1B illustrates an example of portfolio diversification and performance data output by a learning engine, which can be visualized, for example, on a graphical user interface, in an embodiment.

Figure 2:
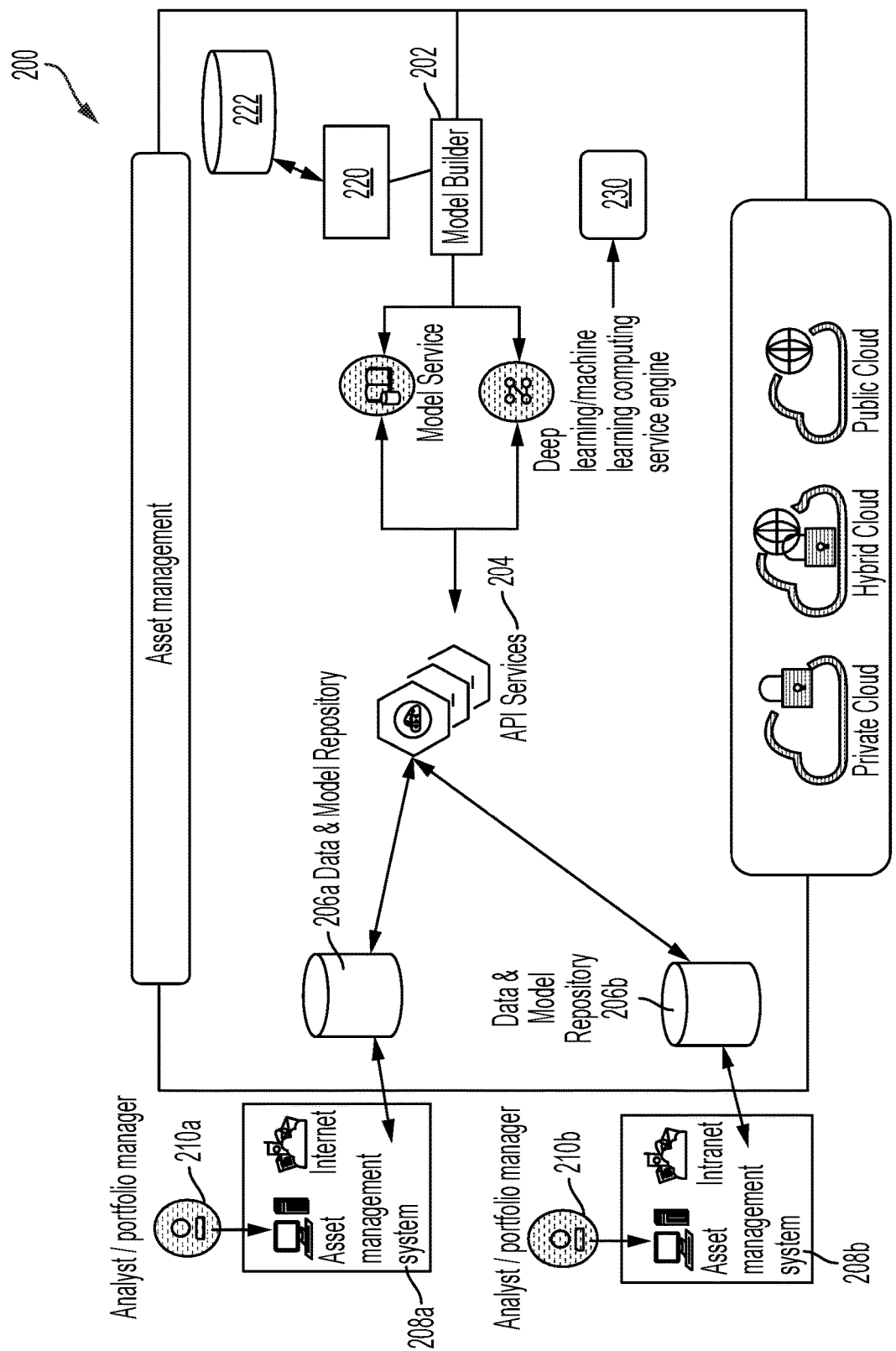
FIG. 2 is a diagram illustrating an example of computer system architecture that can implement generative network portfolio management system in one embodiment.

FIG. 2 is a diagram illustrating an example of computer system architecture that can implement generative network portfolio management system in one embodiment. The system 100 can be a cloud-based system, such as a computing system being implemented by a cloud-computing platform. In another example, the system can be a server-based system. The system can include a processor 220 configured to be in communication with a memory 222. The processor 220 and the memory 222 can be components of a computer device, where the computer device can be, for example, a desktop computer, a laptop computer, a server, and/or other types of computer devices. In some examples, the processor 220 can be one or more cores among a multi-core processor, a special purpose processor, a programmable device, and/or other types of hardware. The processor 220 may include one or more components such as programmable logic devices, microcontrollers, one or more memory devices, and/or other hardware components, which may be configured to perform respective tasks described in the present disclosure.

The system 100 can further include a model builder 202, one or more application programming interface(s) (API) 204, one or more data model repositories 206a, 206b, and one or more asset management systems 208a, 208b. In some examples, the data model repositories 206 can be parts (e.g., memory partitions) of the memory 222. The model builder 202 can be implemented by the processor 220. In some examples, the model builder 202 can include code, such as source code, object code, and/or executable code. The processor 220 can be configured to implement the model builder 202 to build a machine learning model 230 ("model 230") using various learning techniques, such as deep learning techniques. In some examples, the model 230 can be a deep learning neural network, for example, GAN. An example of model training and structure is described in more detail below. In some examples, one or more components of the system can be components of a cloud computing platform.

The APIs 204 can be implemented by a plurality of devices that belong to a plurality of domains, and the APIs 204 can output data of a respective domain. For example, a weather API can be implemented by a server of a weather forecast platform to provide weather-related data to the system 100. The data output by the APIs 204 can be received at the processor 220, and the processor 220 (or model builder 102) can use the data output by the APIs 104, e.g., in addition to historical data corresponding to one or more assets, to train the model 130. The data being output by the APIs 204 can be stored in the memory 222 and/or the data model repositories 206a, 206b.

The asset management systems 208a, 208b can be configured to access data stored in the data model repositories 206a, 206b. The asset management systems 208 can be operated by respective end users. For example, an end user 210a can operate the asset management system 208a and an end user 210b can operate the asset management system 208b. An asset management system (e.g., 208a) can be implemented as a portfolio management system to manage a portfolio including a plurality of assets (e.g., equities, stocks, investment products, etc.). The asset manage system 208*a* can provide a platform for an end user to generate a portfolio and to determine various performance metrics of the generated portfolio. Further, the asset management system 208*a* can provide a platform for an end user to determine various performance metrics of a particular asset. For example, an end user can select and/or upload one or more assets, and the processor 220 can apply or run the model 230 to generate various performance metrics of the selected or uploaded assets. Some examples of these performance metrics can include a forecast of revenue growth, earnings, asset future, benchmark portfolio performance, returns, and/or other performance metrics. Further, the performance metrics being output by the application of the model 230 can include time-series data, such that forecasted performance metrics across different time epochs can be presented or displayed to the end users via the asset management systems 208*a*, 208*b*.

In an example, the processor 220 and the memory 222 can be components of a cloud computing platform configured to provide applications that may be necessary to run the asset management systems 208*a*, 208*b* on a plurality of end user devices. The processor 220 and the end user devices can be communication nodes of a computer network, where data relating to these asset management applications can be communicated among these communication nodes. The APIs 204 can be implemented by a plurality of computer devices associated with different domains. A system 200 can be formed by integrating the computer devices, which are implementing the APIs 204, into the computer network as new communication nodes. The processor 220 can utilize data provided by the APIs 204 to implement the system 200 and the methods being described herein. Further, the processor 220 can be integrated with, for example, the model builder 202, to process the data obtain from the APIs 204 and use the processed data to generate machine-readable training data that can be used by the processor 220 to develop and train the model 230 using the methods described herein. The model 230, that can be trained based on the data obtained from the integrated APIs 204 and the integrated model builder 202, can output, to the asset management system 208*a*, portfolio diversification and performance, forecasts of different performance metrics with respect to one or more assets or portfolios. The outputted forecasts can provide a prediction on the performance metrics of assets, interpretations of the prediction results.

To be described in more detail below, the system 200 can provide a learning engine, which can include a deep learning model that learns to forecast uncertainty and an optimization model that optimizes portfolio diversification based on the forecasted uncertainty. An example of a learning engine is shown in FIG. 1 at 116.

Figure 3A:
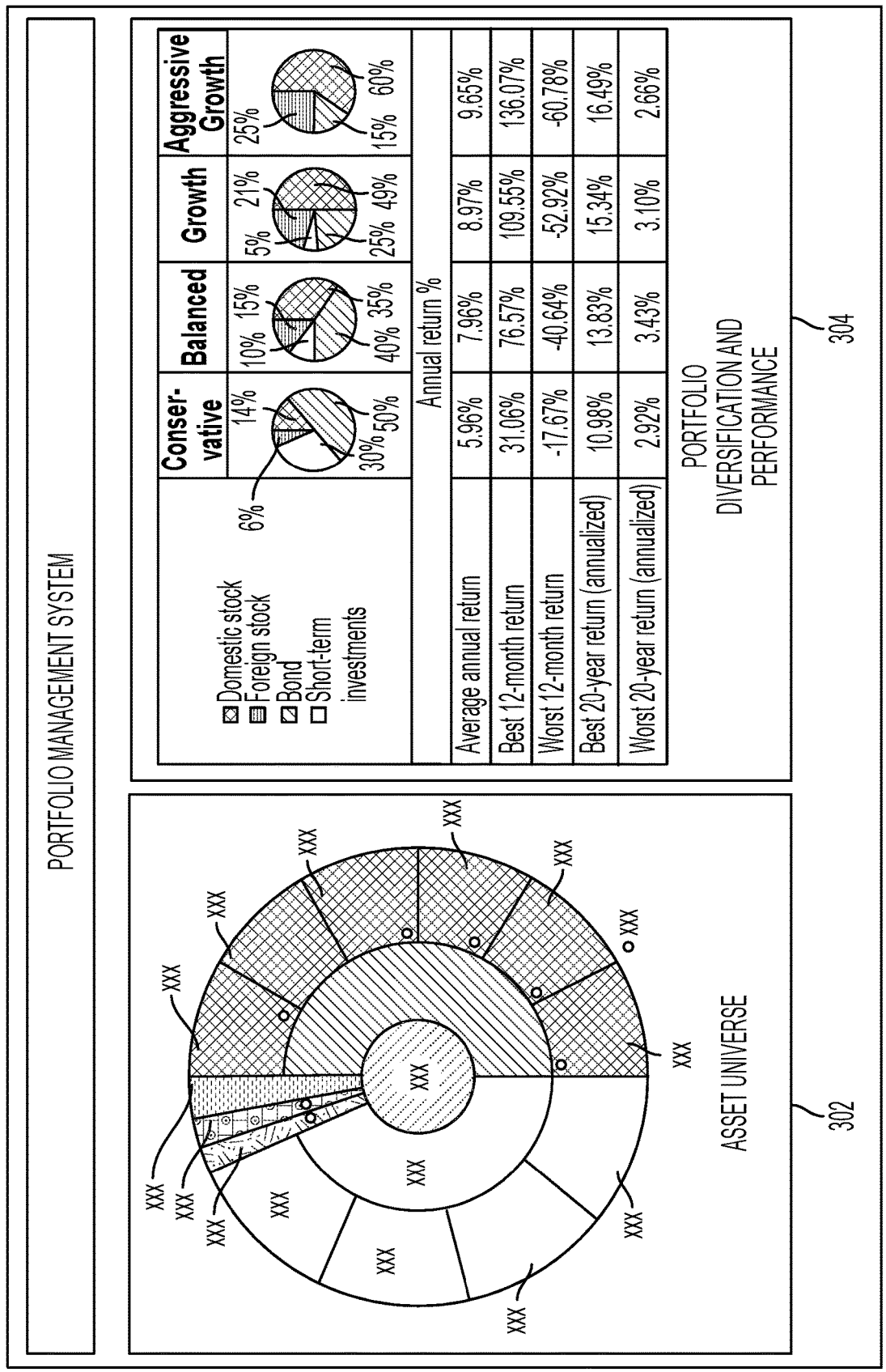
FIGS. 3A, 3B and 3C illustrate examples of user interface displays allowing end users to determine portfolio diversification in one embodiment.
Figure 3B:
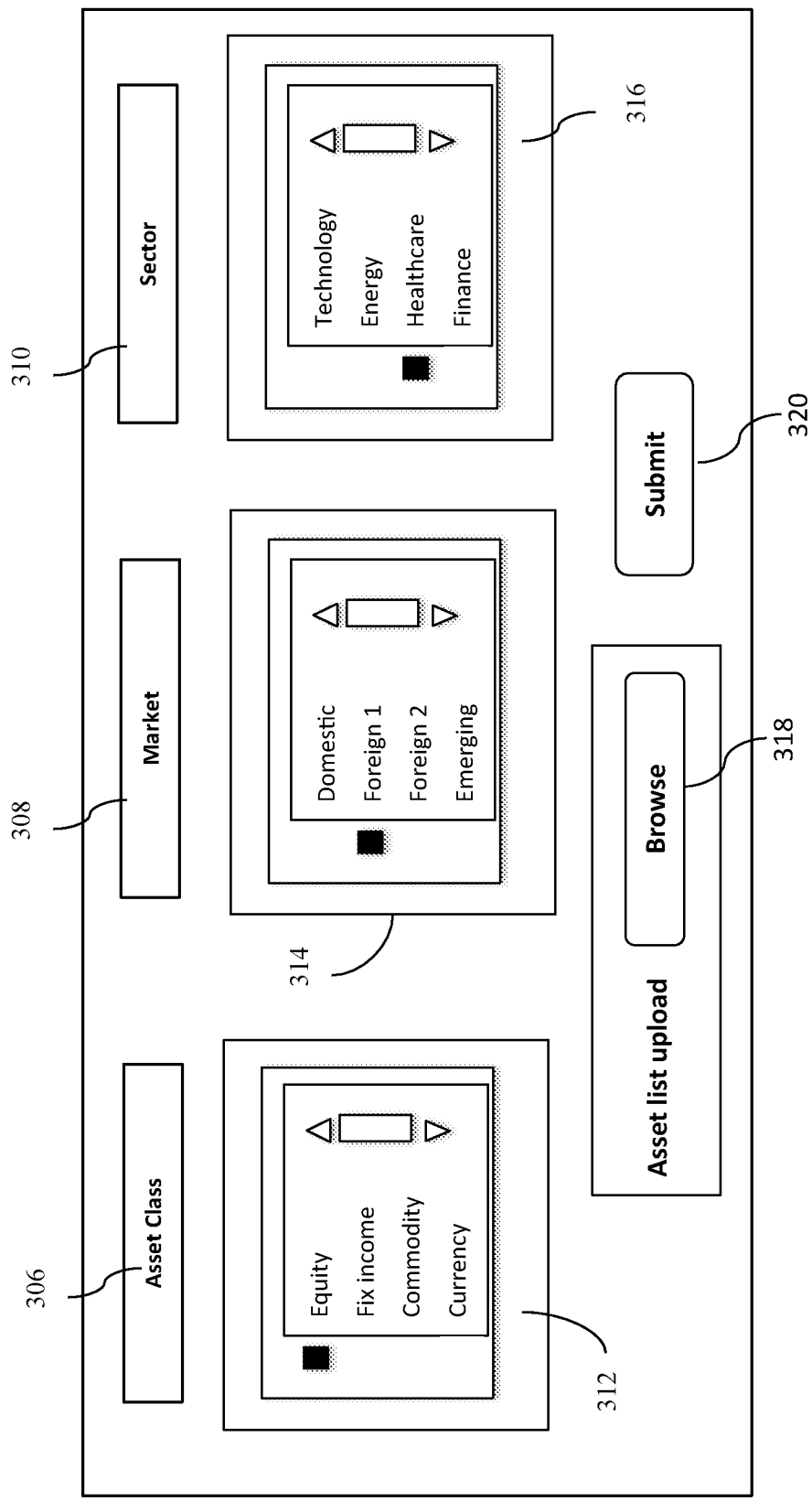
Figure 3C:
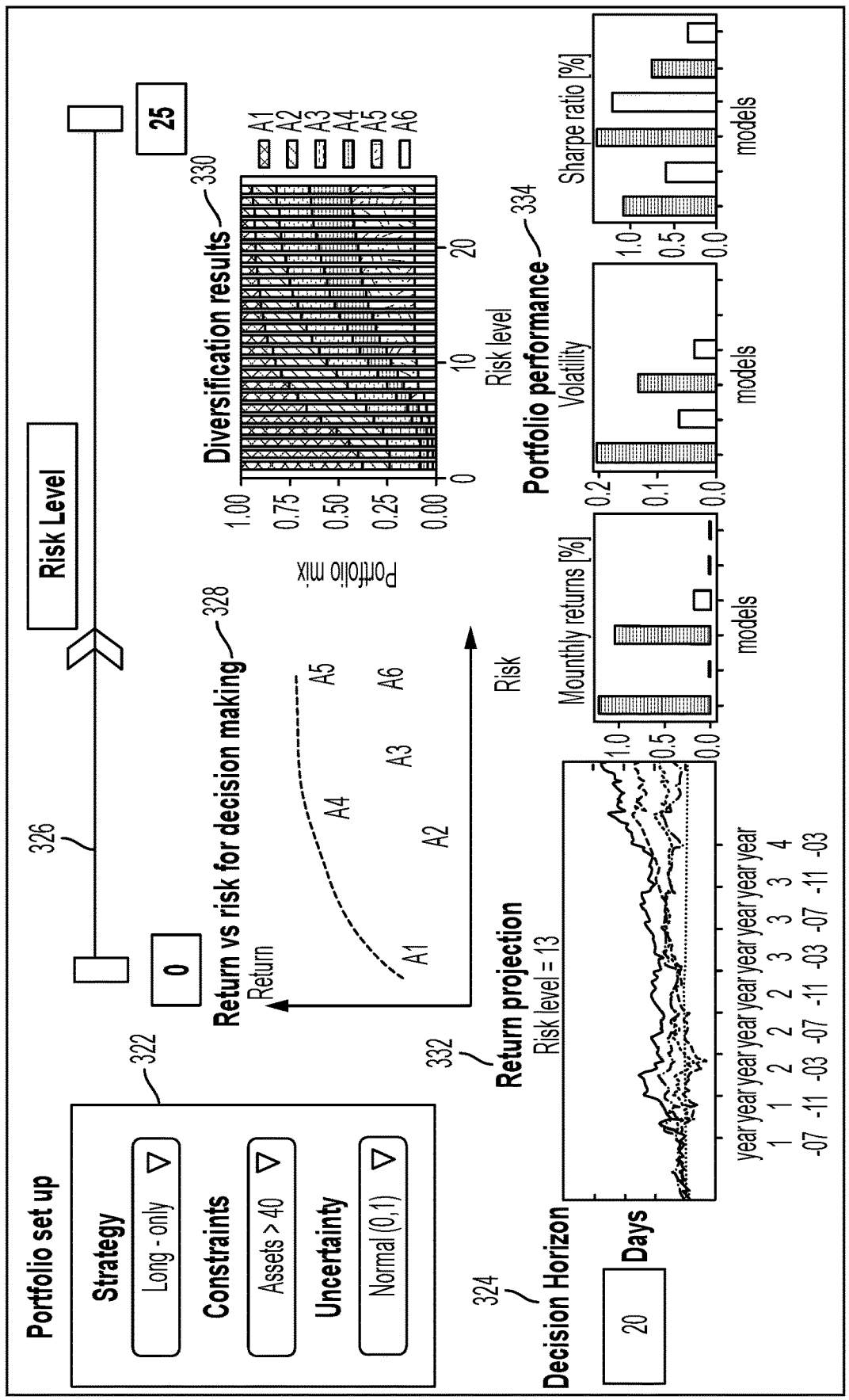

In an embodiment, a portfolio management system, e.g., 208*a* can include a user interface such as a graphical user interface for interacting with a user, e.g., 210*a*. FIGS. 3A, 3B and 3C illustrate examples of user interface displays allowing end users to determine portfolio diversification in one embodiment. Components presented on the graphical user interface can include interactive components, which a user can select, click and enter input. For example, referring to FIG. 3A, selecting or clicking on an "asset universe" component 302 with an input device (e.g., mouse, touching on touch screen, gesture, etc.) can trigger a user interface display shown in FIG. 3B to be presented. Similarly, selecting or clicking on a "portfolio diversification and performance" component 304 with an input device (e.g., mouse, touching on touch screen, gesture, etc.) can trigger a user interface display shown in FIG. 3C to be presented.

A user interface such as one shown in FIG. 3B can allow a user to specify various parameters associated with the assets the user would like to include in a portfolio. For instance, a GUI can allow a user to enter an asset class 306, market type 308 and sector 310, via interactive menus 312, 314, 316. The GUI can also allow a user to upload an asset list, for example, saved as a file. For instance, selecting or clicking on a browse button or like GUI element 318 can allow a user to navigate to a directory or folder and upload a file. In another example, an input field can be provided for allowing a user to enter a file name to upload. Via a GUI such as one shown in FIG. 3B, a user can select or directly upload asset list for constructing a portfolio. Selecting or clicking on a submit button or like GUI element 320 triggers the input data to be communicated, for example, sent to a data and model repository (FIG. 2, 206*a*) for storing and for a processor (FIG. 2, 220) to retrieve and perform portfolio diversification data generation.

Referring to FIG. 3A, selecting the option at 304 can trigger presentation of a GUI display shown in FIG. 3C or the like, and allows a user to set up a desired portfolio. For instance, via such a GUI, a user can input data parameters such as strategy, constraints and uncertainty at 322. A GUI component at 324 allows a user to enter decision horizon, for example, a number of days or another period indicator. Another GUI element such as an adjustable bar 326 can allow a user to enter a desired risk level.

Given the user input data such as the asset list, portfolio set up parameters, selected risk level and decision horizon, the system (e.g., FIG. 2, 200) can generate a portfolio diversification and performance data. For instance, the system can provide a graph that represents "return versus risk" associated with assets (e.g., selected assets) 328, diversification results (e.g., portfolio mix at different risk levels of the selected assets) 330, a return projection at a risk level over a period 332 and portfolio performance data 334. The "return versus risk" visualization 328 shows with a continuous line an example of efficient frontier that one can identify in the risk-returns objective space by diversifying the portfolio with a set of assets (annotated as A1-A6). The diversification results 330 show results for a considered portfolio by a risk level. Different diversification results can be visualized by varying the target risk level, for example, given a select horizon f (e.g., number of days). The return projection 332 shows simulation results along a period. Different projections can be also visualized for different diversification risk setting. Different benchmarks can be shown with different visualization, e.g., with different dashed and solid lines. The portfolio performance data 334 shows benchmark data comparing results of a plurality of models. For example, several models using the methodology disclosed herein can be trained and compared with respect to different risk levels. One or more models created based on one or more known techniques can be compared as benchmarks.

Figure 4:
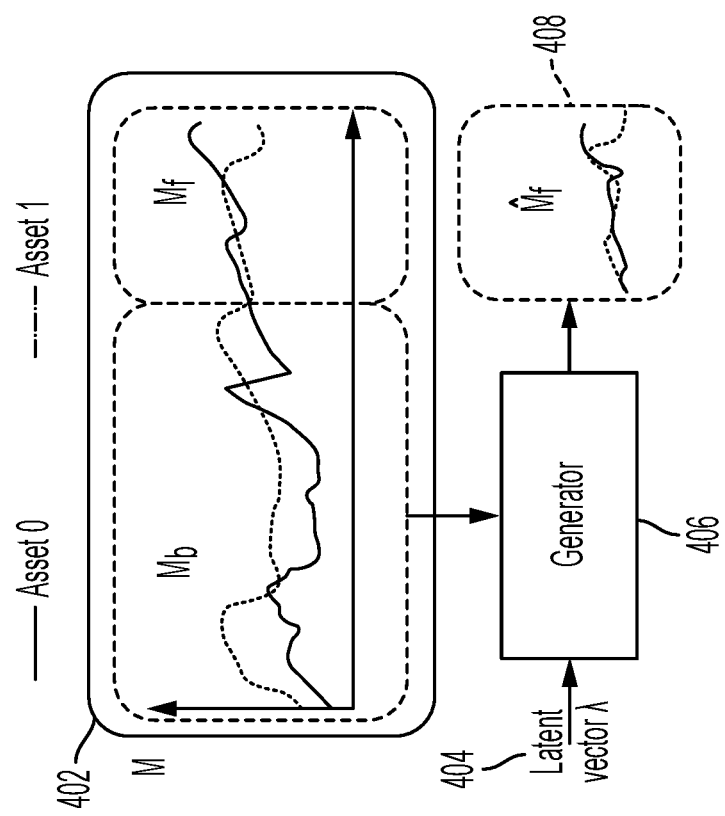
FIG. 4 shows an overview of input and output of a generative adversarial network (GAN) generator in one embodiment.

In embodiments, a system and method are provided that implement deep-learning networks 1Dime series data. An example implementation of a learning engine, e.g., shown in FIG. 1 at 116, can include such deep-learning neural networks. One dimensional (1D) convolutional networks can be an effective tool to process time series. In an embodiment, the system for example, processes times series by convolutional networks and represents the asset-price trends as a matrix M with k rows (financial assets) and w columns (days), $M \in \mathbb{R}^{k \times w}$. The deep-learning networks process the time information by convolving along the time dimension. The system in an embodiment models the probability distribution of the asset-price trends for the future f days given the current market situation represented by the latest observed b day. FIG. 4 shows an overview of input and output of a generative network (e.g., a generative adversarial network (GAN)) generator in one embodiment. The system in an embodiment considers the matrix M 402 to span the whole analysis length: w=f+b. In an embodiment, M is composed of two parts: 1) the known past $M_b$ of length b, and 2) the unknown future $M_f$ of length f. The system can apply a generative deep-neural network G 406 to learn the probability distribution of future price trends $M_f$ within the target future horizon f given the known recent past $M_b$, and a prior distribution of random latent vector 404. FIG. 4 shows a graphical interpretation of what the matrix M represents and the input and output of the generator G 404. Formally the generative model returns a synthetic possible future matrix $\hat{M}_f$ 408 (a simulation) as a function:

$$\hat{M}_f = G(M_b, \lambda), \tag{1}$$

where $\lambda$ is the latent vector sampled from a prior distribution. In practice, $\lambda$ represents the unknown future events and phenomena impacting the marketplace. The known past $M_b$ is used to condition the probability distribution of the future $\hat{M}_f$ based on the most updated market situation. The generator G 406 is a generative network whose weights are learnt to let $\hat{M}_f$ 408 match the probability distribution of $M_f$ given the past $M_b$ on a set of training data.

Figure 5:
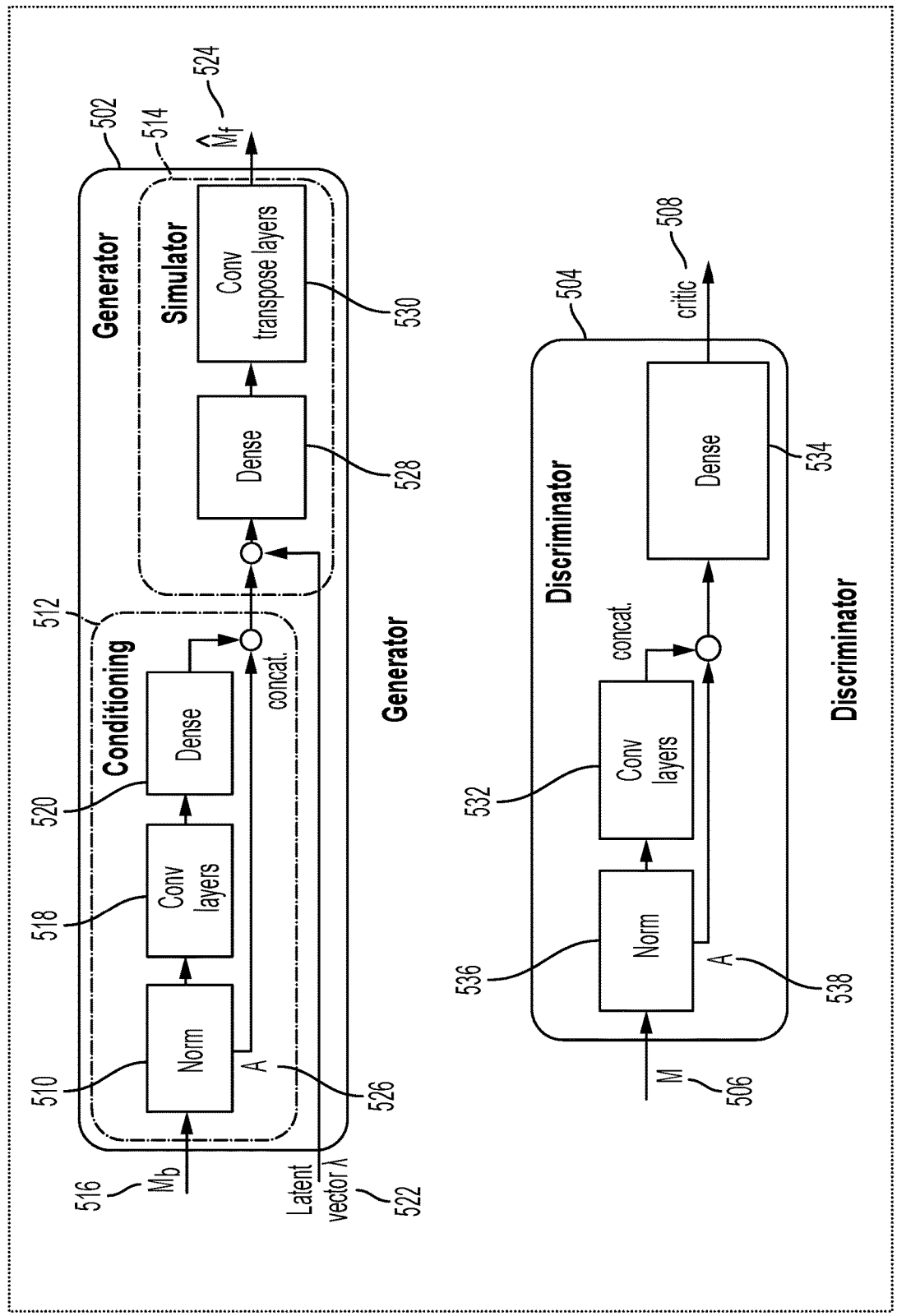
FIG. 5 shows architecture of GAN generative and discriminative models in one embodiment.

FIG. 5 shows architecture of GAN generative and discriminative models in one embodiment. The generator 406 shown in FIG. 4, for instance, can have architecture shown at 502. In an embodiment, the generator G 502 is trained in adversarial mode against a discriminator D 504 with the goal of minimizing the Wasserstein distance between synthetic data $\hat{M}_f$ and real data $M_f$, based on historical observations. The training process has the goal to approximate the real posterior probability distribution $P(M_f|M_b)$ with the surrogate probability distribution $P(\hat{M}_f|M_b)$, given the prior distribution of $\lambda$. In an embodiment, the system uses the normal distribution for the prior $\lambda$.

To implement the adversarial training process, the system in an embodiment considers a discriminator network D 504 to take as input the overall price matrix M 506, which can be the concatenation of the conditioning $M_b$ and either the synthetic data $\hat{M}_f$ or the real data $M_f$. The discriminator output is a critic value c=D(M). The discriminator is trained to minimize c for the real data and maximize it for synthetic data, whereas the generator G's 502 training goal is to minimize c 508 for the synthetic data. In an embodiment Wasserstein GAN (WGAN)-Gradient penalty (WGAN-GP) can be used.

Deep-learning architecture is further described below with reference to FIG. 5.

Data normalization. In an embodiment, the system may consider the adjusted close price p for each financial asset. During training, given a time window of w=b+f days, the system may normalize the prices p for each asset to fit in the range [−1, 1] for the initial b days. The normalization output is the daily asset price variation p(t)−p(t−1) computed in this normalized scale. Normalizing to the range [−1, 1] can expose to the neural networks values limited within a reasonable range. The normalization also can remove from the data information about the price-variability within the given window w. Since the normalized values of $M_b$ always range between [−1, 1], the presence of long tails in the data is normalized out. To feed into the neural network information about the observed price variability and possible presence of long-tails, during the normalization procedure the system may also compute an analysis value a for each asset:

$$a = \frac{p_{max} - p_{min}}{p_{mean}} \tag{2}$$

where $p_{max}$, $p_{min}$, and $p_{mean}$ are respectively the maximum, minimum and mean values of the price p in $M_b$ for a given asset. The system may define the analysis vector A as the vector representation of a to consider multiple assets.

Shown in FIG. 5, the GAN explicitly clarifies the presence of this non-traditional normalization process (Norm) 510.

Generator. The generator G 502 takes as input the price sequence $M_b$ and the latent vector $\lambda$. In an embodiment G 502 is composed of two parts: a) a conditioning network 512 to compute an inner representation of the past price sequence $M_b$, and b) a simulator network 514 to generate the future price trends.

The conditioning input is the most recent market trend $M_b$ 516. After the normalization, the system may apply a set of 1D convolution 518 and dense layers 520 as described in details below by way of example. The conditioning output depends only on $M_b$ and is used to condition the probability distribution of the synthetic data $P(\hat{M}_f|M_b)$, Equation 5.

The simulator network 514 takes as input the conditioning output and the latent vector $\lambda$ 522, and generates as output a simulation of future market prices $\hat{M}_f$24. The conditioning 512, and the simulator 514 together implement the generator G 502 and are trained at once against the discriminator D 504, for example, with the traditional adversarial approach.

Discriminator. The discriminator 504 takes as input either a) the real data M, concatenation of $M_b$ and $M_f$, or b) the synthetic data $\hat{M}$, concatenation of $M_b$ and $\hat{M}_f$. The discriminator output is computed by the network shown at 504.

Architectural parameters. By way of example, the following describes all parameters of the generator and discriminator networks in an embodiment. By way of example, detailed architectural parameters for the generator G 502, and the discriminator D 504 are listed in Tables I, and II. Other parameters/values can be implemented.

TABLE I

Example of a list of generator parameters.

| Description | Value |
| --- | --- |
| Size of latent vector $\lambda$ | 2 × k |
| Analysis window w = b + f | 60 |
| Forward window f | 20 |
| Backward window b | 40 |
| Convolution (conv.) layers in conditioning | 4 |
| Input and output channels in all conv. layers in conditioning | 2 × k |
| Dense layer output size in conditioning | k |
| Dense layer output size in simulator | f × k |
| Transpose conv. layers in simulator | 2 |
| Input channels in the first transpose conv. layers in simulator | 4 × k |
| Output channels in the first transpose conv. layers in simulator | 2 × k |
| Input channels in the second transpose conv. layers in simulator | 2 × k |
| Output channels in the second transpose conv. layers in simulator | k |
| Layers' activation function in conditioning and simulator | ReLU |
| Conv. (and transpose conv.) kernel length in conditioning and simulator | 5 |
| Conv. (and transpose conv.) stride in conditioning and simulator | 2 |

TABLE II

Example of a list of discriminator parameters.

| Description | Value |
| --- | --- |
| Analysis window w | 60 |
| Convolution layers in D | 5 |
| Input channels for the i-th convolution layer in D | $k \times 2^{i-1}$ |
| Output channels for the i-th convolution layer in D | $k \times 2$ |
| Layers' activation function in D | Leaky ReLU |
| Convolution kernel length | 5 |
| Convolution stride | 2 |

Optimizer. GAN generator and discriminator (e.g., FIG. 5) can be trained with Adaptive Moment Estimation (ADAM)'s optimizer (an adaptive learning rate optimization algorithm) with learning rate $2 \times 10^{-5}$, and $\beta_1 = 0.5$ For example, GAN models can be trained for a number of epochs such as 15,000 epochs.

Generator. By way of example, the conditioning network 512 in the generator G 502 can be composed of 4 consecutive convolutional layers with a constant number of channels. The system can use a convolution stride of two to iteratively compress the inner representation of the backward sequence $M_b$ by halving the time resolution at each layer. In generative models, the resolution can be compressed by using strided convolution. The output of these convolutional layers 518 is then processed by a dense layer 520, and then concatenated with the analysis vector A 526 and the latent vector $\lambda$ 522.

The simulator network 514 can include a first dense layer 528 followed by a sequence of transpose convolution layers 530. In GAN in an embodiment, the generator applies transpose convolutions with strides of two to iteratively compress the number of channels and expand the time resolution. The system may apply two transpose-convolution layers. The output of the last transpose convolution has a number of channels equal to the number k of assets in the target portfolio, and a time resolution equal to the simulation horizon f. At every layer of the generative transpose convolutions the system may halve the number of channels and double the time resolution. Thus the output of the dense layer right before the first transpose convolution has by construction $2^1 \times f/2^1 \times k = f \times k$ outputs, where 1 is the number of transpose-convolution layers.

Discriminator. By way of example, the discriminator 504 can be implemented with a sequence of convolutional layers 532 that iteratively halves the time resolution and doubles the channels. The output of the convolutional layers 532 is concatenated with the analysis vector A 538 and input to the dense layer 534. The last dense layer 534 has a single output, a critic value 508, for example, as in WGAN-GP. The system may apply spectral normalization on the kernel weights of the discriminator to improve the convergence and stability of adversarial training. Discriminator may also include a normalization process 536, which normalizes the input data, for example, as described with reference to 510 in the generator.

The output of the generator can be used in an optimization to generate a portfolio diversification data, for example, as shown in FIG. 1 at 120. Portfolio optimization is described below by way of example.

Portfolio Optimization

Once the training process is completed, the generator G is able to synthesize realistic future trends $\hat{M}_f = G(M_b, \lambda)$. The system may use these synthetic simulations to numerically estimate the expected risks and returns for different portfolio diversification options x. The system in one embodiment may execute a portfolio optimization on the estimated posterior probability distribution:

$$P(\hat{M}_f | M_n), \hat{M}_f = G(M_b, \lambda) \quad (3)$$

given the known prior distribution of $\lambda$ and the conditioning $M_b$.

For a given conditioning $M_b$, the system can consider a set S of n simulations $\hat{M}_f \in S$ sampled from $P(\hat{M}_f | M_b)$ by evaluating the generative model $G(M_b, \lambda)$ on different extractions of $\lambda$. The system may define also the return vector function $r(\hat{M}_f)$ where the i-th element $r_i$ is the return obtained by the i-th asset at the end of the simulation horizon for one simulation $\hat{M}_f$ given by $r_i = e_i / s_i - 1$, where e is the asset price at the end of the simulation $\hat{M}_f$ and s is the price at the beginning of the simulation. Since the constant in the definition of $r_i$ does not impact the optimization results, the system in one embodiment may use $$r_i = e_i / s_i \quad (4)$$

The portfolio returns achieved with the diversification x for a given simulation $\hat{M}_f$ is:

$$r_p(x, \hat{M}_f) = x \cdot r(\hat{M}_f) \quad (5)$$

The simulations $\hat{M}_f \in S$ sampled from the probability distribution $P(\hat{M}_f | M_b)$ are used to infer the probability distribution $P(r_p(x, \hat{M}_f) | M_b, x)$.

In an embodiment, the portfolio optimization problem is defined as in the traditional Markowitz' optimization approach, yet it is executed on the predicted future probability distribution $P(r_p(x, \hat{M}_f) | M_b, x)$ that is non-normal and includes nonlinear interactions between the different assets. For instance, the optimization goal is to identify the configurations of x that maximize the expected returns $\mu_p = \mathbb{E}(r_p(x, \hat{M}_f) | M_b, x)$ and minimize a risk function $\theta(M_b, x)$. Both $\theta$ and $\mu_p$ are estimated on the base of the simulation samples $\hat{M}_f \in S$. In this framework, the risk function (x) can be any metric such as the value at risk, or the volatility. Without loss of generality, the system may use the estimated volatility (variance or standard deviation of returns) that enables the system to evaluate the approach directly with respect to the traditional Markowitz's methodology (Modern Portfolio Theory (MPT)). The optimization problem can be formalized as:

$$\max_x \mu_p(x|S), \quad (6)$$

$$\min_x \theta(x|S), \quad (7)$$

$$\mu_p(x) = \mathbb{E}(r_p(x, \hat{M}_f) | M_b, x) \quad (8)$$

$$\theta(x) = \sigma_p^2(x) = \mathbb{V}ar(r_p(x, \hat{M}_f) | M_b, x) \quad (9)$$

where Equations 6, and 7 are the target objectives. The notations $r_p$ represent a portfolio future return and x represent a portfolio diversification, for example, a vector x can be the amount of capital invested in the i-th asset. The system can optimize the portfolio diversification x to maximize the expected returns and minimize the risk. $\sigma_p^2(x)$ represents portfolio risk factor.

By way of example, the system may solve the optimization problem by using of a multi-objective genetic algorithm (multi objective optimization technique), for example, the non-dominated sorting genetic algorithm II (NSGA-II) to provide a trade-off between expected returns and risk. The output of the NSGA-II is a set X(S) that depends on the simulations S. Elements $x \in X$ are Pareto-optimal diversifications trading off returns and risk. The decision of what diversification strategy x∈X to use can depend on a goal, for example, a user's goal.

Figure 6:
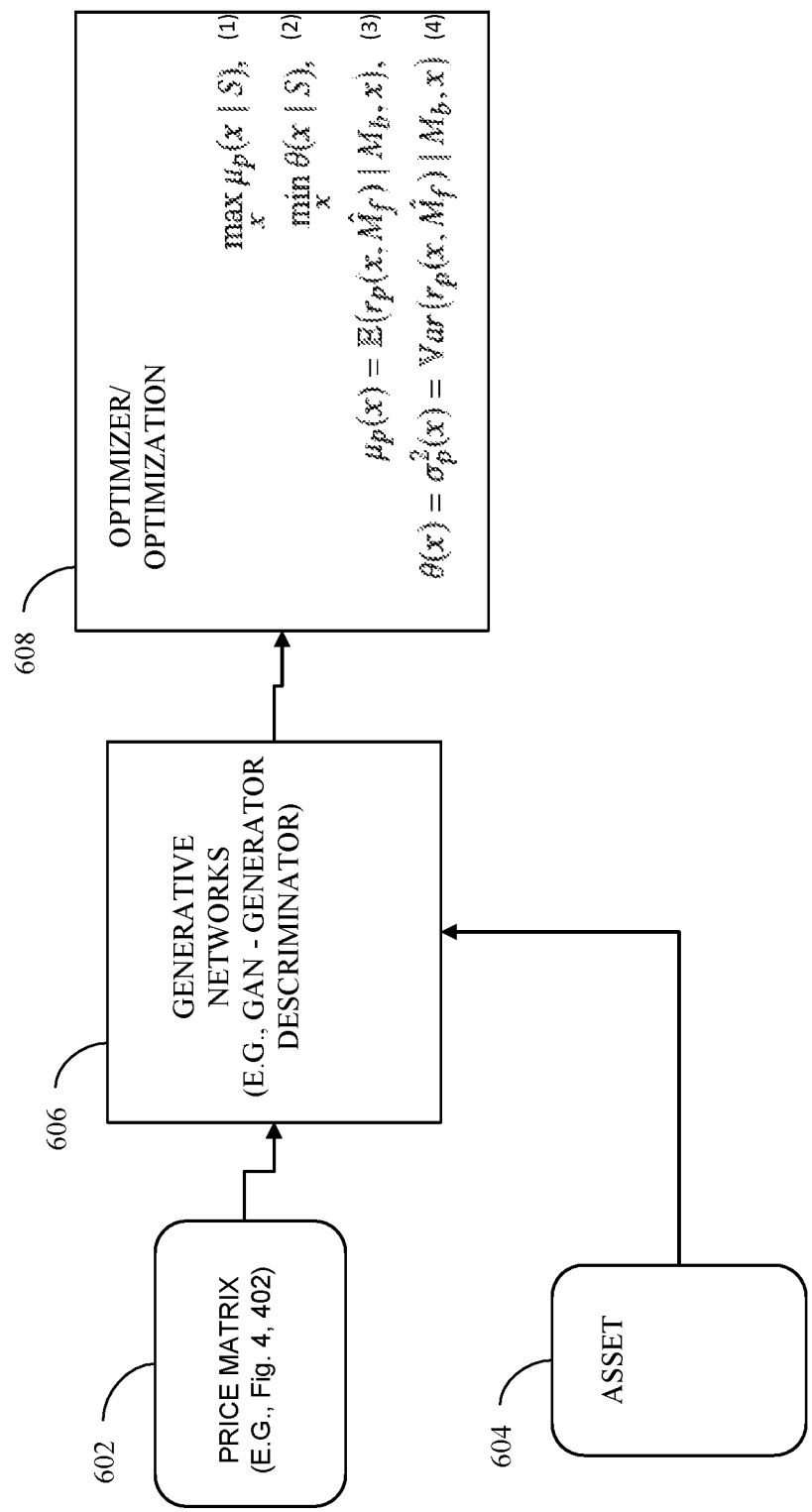
FIG. 6 shows an overview of a generative network and optimization in one embodiment.

FIG. 6 shows an overview of a generative network and optimization in one embodiment. Price matrix 602 can include known past price matrix $M_b$ of length b and unknown future $M_f$ of length f. Example of price matrix is described above with reference to FIG. 4. Asset list 604 can include a list of assets, e.g., input by a user (e.g., as shown in FIG. 3B). An example asset list may list a number of assets, for example, by their identifying information. Identifying information may include ticker identifier, type, industry, description and currency. In an embodiment, input data can 602 and/or 604 can be normalized to remove long tail impact. Price matrix 602 includes historical price data of assets in the asset list 604, for example, selected by a user. A system in one embodiment can retrieve the historical price data, for instance, by using an application programming interface (API) and/or from a database.

A generative network 606 trains a generator to model future price uncertainty. For instance, the generative network 606 models the uncertainty of the marketplace, and introduces a latent vector sampled from a prior distribution to represent the unknown future events and phenomena impacting the market place. A latent vector includes features which may not directly observable in prior distribution, but which can be inferred from the prior distribution. This latent factor can be sampled from prior distribution. The distribution can be normal, Laplacian, and/or another. The parameter of the prior distribution can be given by a user and/or configured.

The generative network 606 performs deep learning to learn future joint conditional price distribution and nonlinear dependency of the assets in the asset list 604. For instance, a conditional network computes an inner representation of the past price sequence $M_b$. The conditioning network in the generator can include consecutive convolutional layers with a constant number of channels. A convolution stride of two may be implemented to iteratively compress the inner representation of the backward sequence $M_b$ by halving the time resolution at each layer. The output of these convolutional layers is then processed by a dense layer, and then concatenated with the analysis vector A and the latent vector k.

A simulator network generates the simulation of future price trends $\hat{M}_f$. The simulator network can include a first dense layer followed by a sequence of transpose convolution layers. The generator may apply transpose convolutions with strides to iteratively compress the number of channels and expand the time resolution. The output of the last transpose convolution can have a number of channels equal to the number k of assets in the target portfolio, and a time resolution equal to the simulation horizon f.

A discriminator takes as input the real data M, ($M_b$ and $M_f$), or the synthetic data $\hat{M}$, (Mb and $\hat{M}_f$). The discriminator can be implemented with a sequence of convolutional layers that iteratively decreases the time resolution and increases the channels. The last dense layer can have a single output, a critic value, for example, as proposed in WGAN-GP. Kernel weights of the discriminator can be normalized to improve stability.

Portfolio optimization can be performed based on learnt future joint conditional price distribution. For instance, a processing component (e.g., a processor) executes a portfolio optimization 608 on the estimated posterior probability distribution $P(r_p(x,M_f)|M_b,x)$ with portfolio diversification x. In one aspect, Non-normal distribution includes non-linear interactions between different assets. An optimization problem that is solved in the portfolio optimization 608 can be formulated as shown at 608, for example, also shown in Equations (6), (7), (8) and (9).

In an embodiment, without loss of generality, a simple fully invested long-only portfolio can be formed without any constraints as an example. For example, "long-only" parameter may be a variable input by a user specifying strategy during portfolio setup (e.g., FIG. 3C). Other examples of the strategy may include, but are not limited to, "pair trading" and "momentum". Risk level input can be a relative value, e.g., 10 out of maximum 20. A user selected risk level can be used as a constraint to optimize the portfolio and control the risk. The notation x represents diversification vectors in terms of capital allocation to each asset. For instance, a portfolio diversification strategy can be defined as a vector x, where $x_i$ represents the amount of capital one invests in the i-th asset. The portfolio diversification x can be optimized to maximize the expected returns and minimize the risk. The notation S represents a set s of n generated $\hat{M}_f$. The notation $r_p(x,\hat{M}_f)$ represents the portfolio returns achieved with the diversification x for a given $\hat{M}_f$. $\max_x \mu_p(x|S)$ maximizes portfolio expected returns; $\min_x \theta(x|S)$ minimizes portfolio risk; $\mu_p(x) = \mathbb{E}(r_p(x,\hat{M}_f)|M_b,x)$ specifies expected returns function; $\theta(x) = \sigma_p^2(x) = \mathbb{V}ar(r_p(x,\hat{M}_f)|M_b,x)$ specifies risk function that can be any metric, such as value at risk or volatility.

Figure 7:
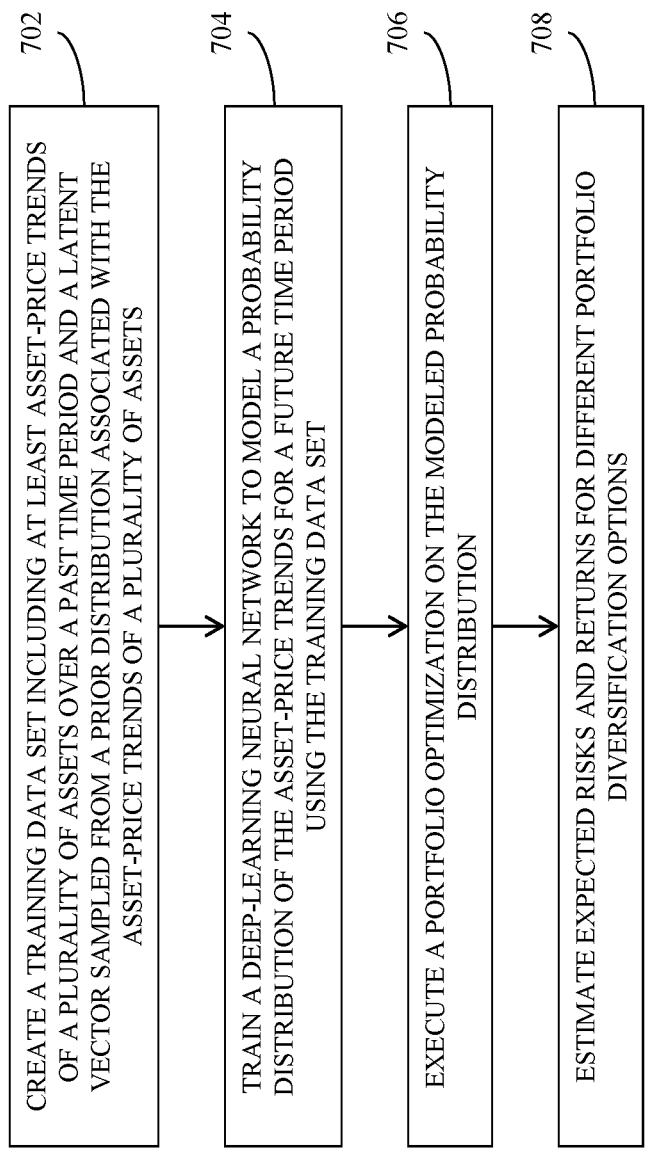
FIG. 7 is a diagram illustrating a method in one embodiment.

FIG. 7 is a diagram illustrating a method in one embodiment. The method, for example, may include learning nonlinear interactions between different assets. A learned model can be executed for analyzing possible future situations. For example, machine learning such as generative networks learn a joint posterior probability distribution. The joint posterior probability distribution learnt by a machine learning model allows a user to try or experiment different diversification options, for example, to trade off risk for expected returns. Benchmark results from employing the method compared with state-of-art techniques show that the method is able to realize the risk-return trade off and outperform those state-of-art techniques.

At 702, the method includes creating a training data set including at least asset-price trends of a plurality of assets over a past time period and a latent vector sampled from a prior distribution associated with the asset-price trends of a plurality of assets. For example, training data set includes a time series data.

At 704, the method includes training a deep-learning neural network to model a probability distribution of the asset-price trends for a future time period using the training data set. An example of the deep-learning neural network can include GAN.

At 706, the method includes executing a portfolio optimization on the modeled probability distribution, for example, given the known prior distribution of latent vectors and the asset-price trends of a plurality of assets, which may be conditioned.

At 708, the method includes estimating expected risks and returns for different portfolio diversification options based on the portfolio optimization. In an aspect, the different portfolio with expected risks and returns can be visualized. For instance, a graphical user interface can be caused to visualize such data.

Figure 8:
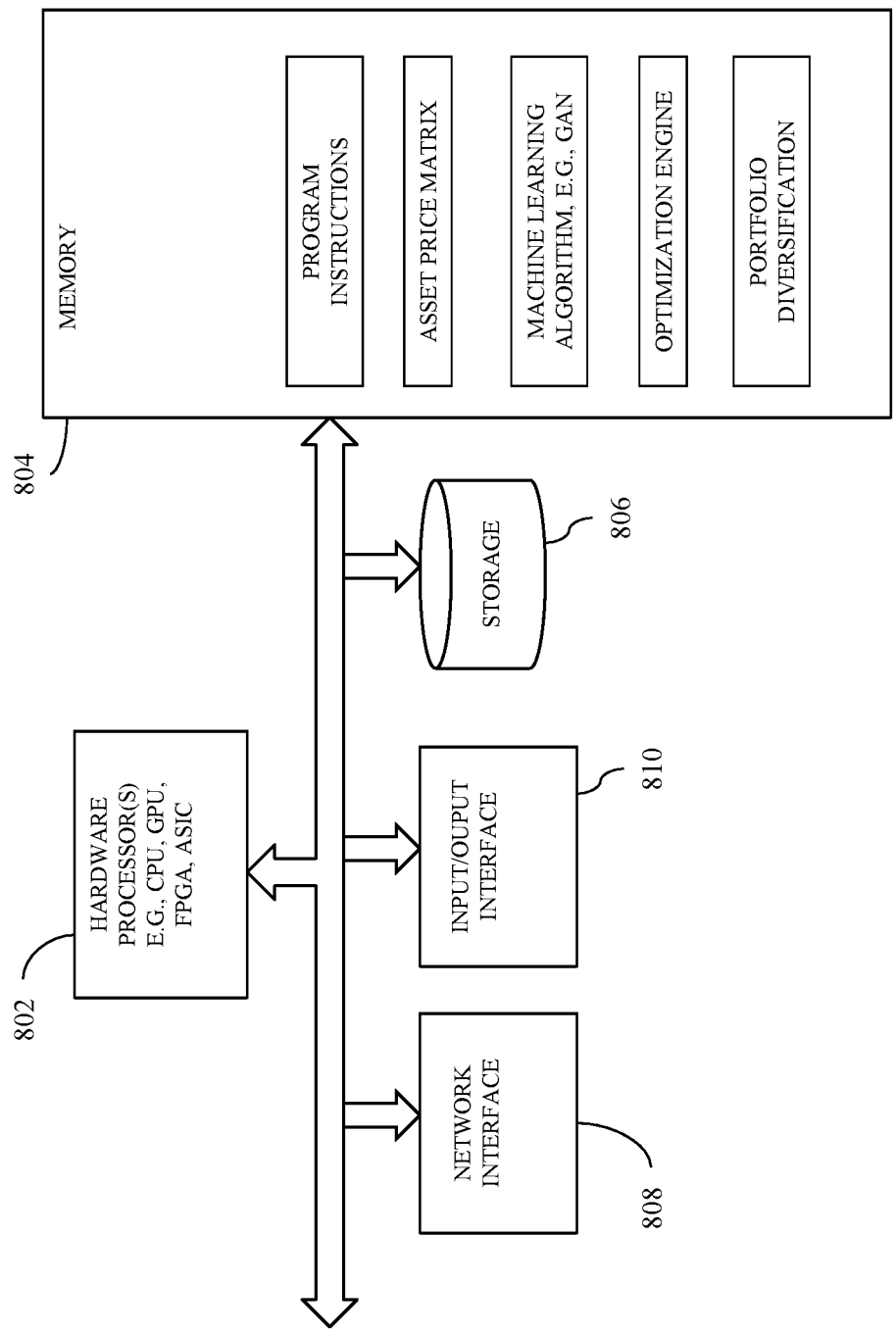
FIG. 8 is a diagram showing components of a system in one embodiment that generates portfolio diversification.

FIG. 8 is a diagram showing components of a system in one embodiment that generates portfolio diversification. One or more hardware processors 802 such as a central processing unit (CPU), a graphic process unit (GPU), and/or a Field Programmable Gate Array (FPGA), an application specific integrated circuit (ASIC), and/or another processor, may be coupled with a memory device 804, and may forecast future conditional probability distribution and generate a portfolio diversification. A memory device 804 may include random access memory (RAM), read-only memory (ROM) or another memory device, and may store data and/or processor instructions for implementing various functionalities associated with the methods and/or systems described herein. One or more processors 802 may execute computer instructions stored in memory 804 or received from another computer device or medium. A memory device 804 may, for example, store instructions and/or data for functioning of one or more hardware processors 802, and may include an operating system and other program of instructions and/or data. One or more hardware processors 802 may receive input comprising price matrix, asset list and portfolio parameters. In one aspect, such input data may be stored in a storage device 806 or received via a network interface 808 from a remote device, and may be temporarily loaded into a memory device 804 for building or generating a generative model. The learned model may be stored on a memory device 804, for example, for execution by one or more hardware processors 802 performing optimization, for example, to generate portfolio diversification data. One or more hardware processors 802 may be coupled with interface devices such as a network interface 808 for communicating with remote systems, for example, via a network, and an input/output interface 810 for communicating with input and/or output devices such as a keyboard, mouse, display, and/or others.

Figure 9:
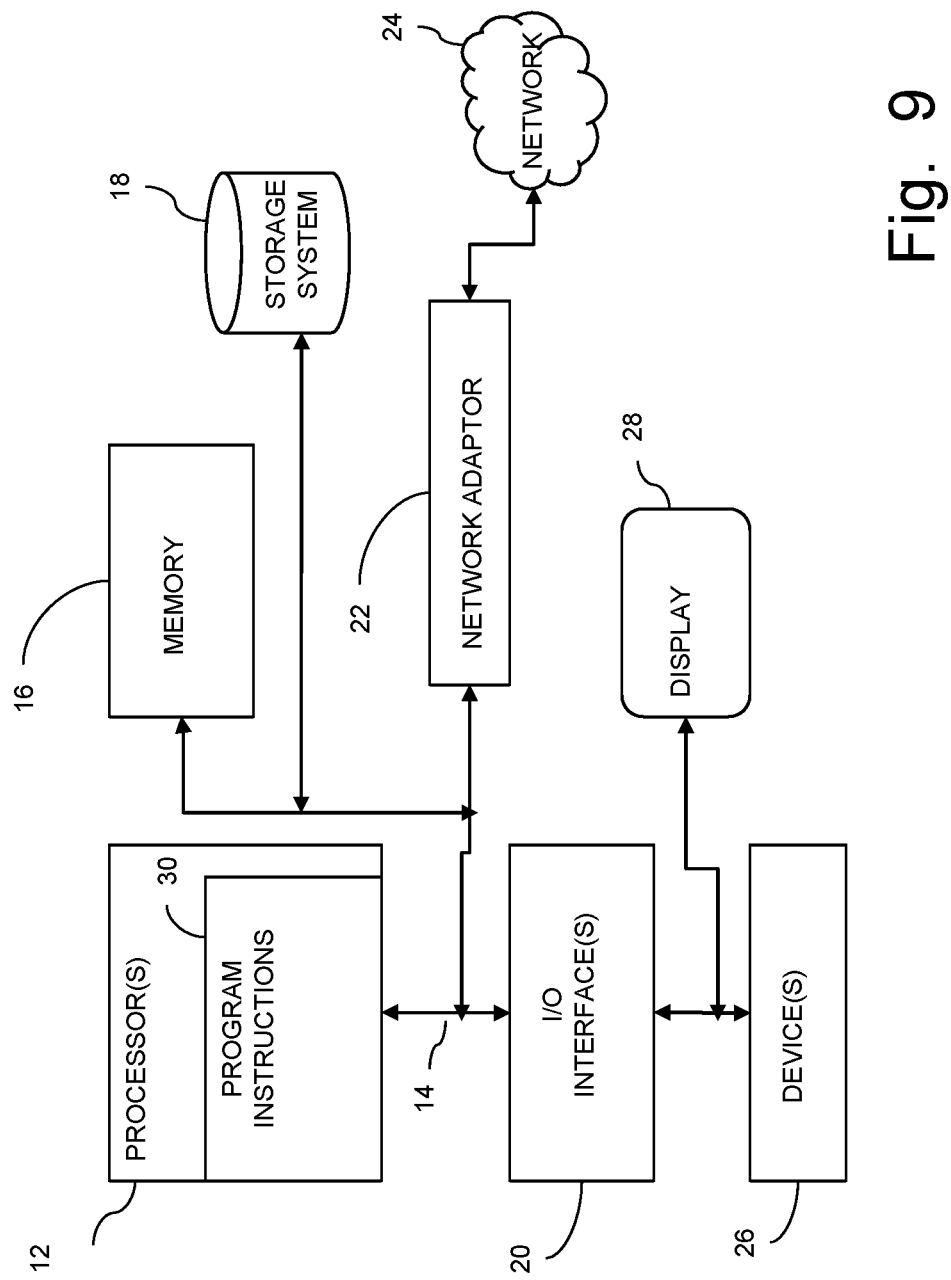
FIG. 9 illustrates a schematic of an example computer or processing system that may implement a system in one embodiment.

FIG. 9 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
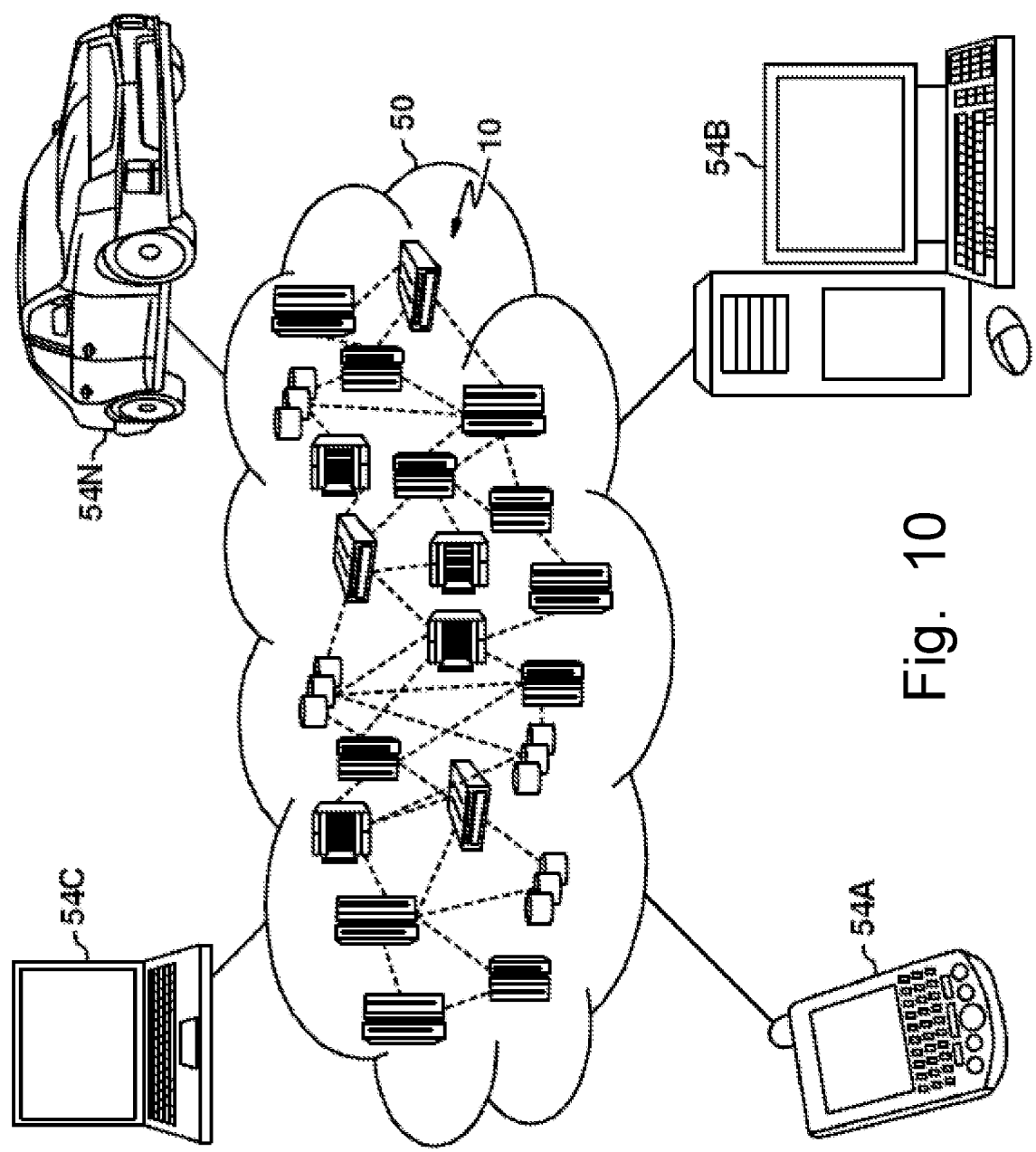
FIG. 10 illustrates a cloud computing environment in one embodiment.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
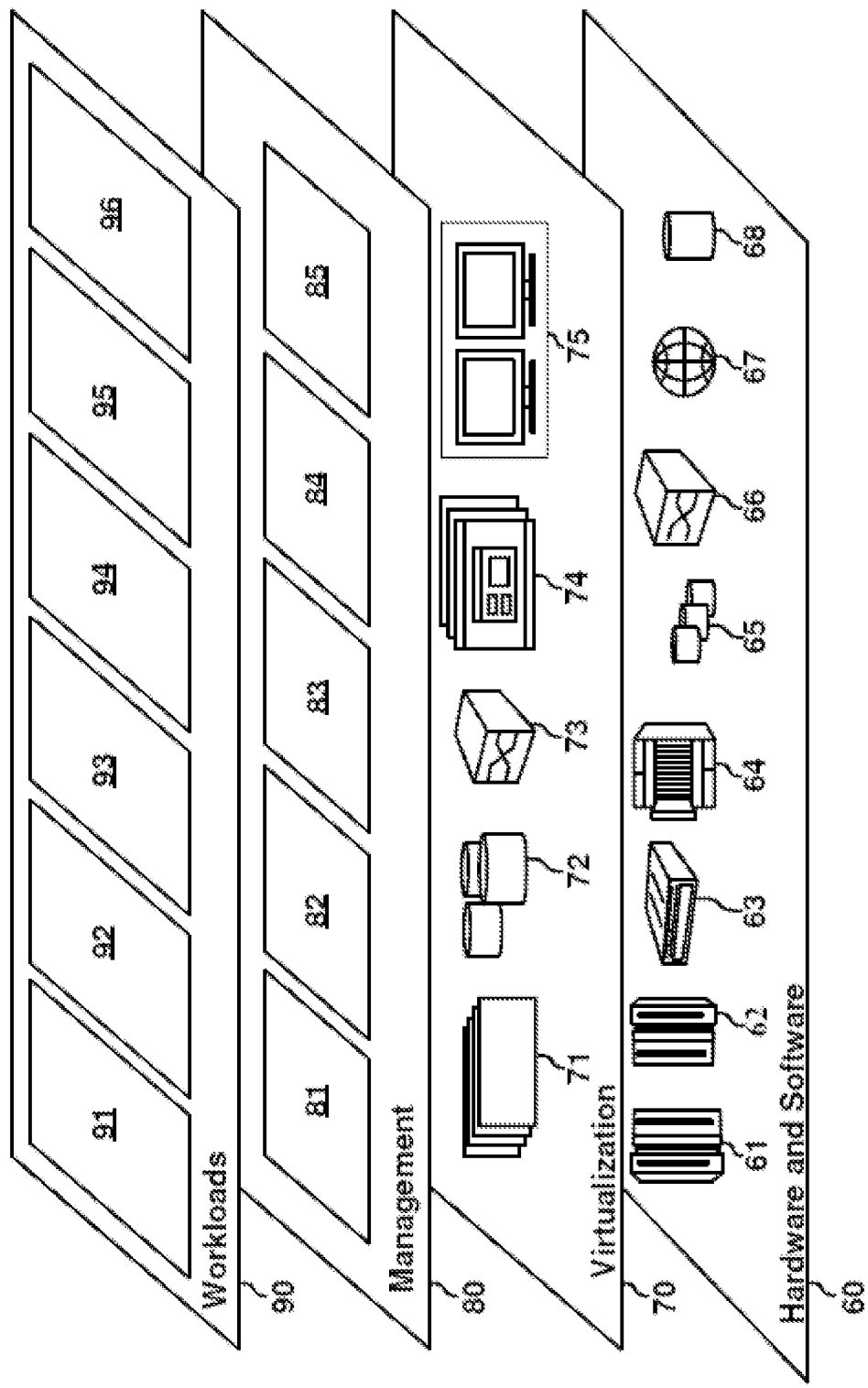
FIG. 11 illustrates a set of functional abstraction layers provided by cloud computing environment in one embodiment of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generative network processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method comprising:
creating a training data set including at least asset-price trends of a plurality of assets over a past time period and a random latent vector sampled from a prior distribution associated with the asset-price trends of a plurality of assets, wherein the training data set includes a time series data, the asset-price trends being normalized, compressed and concatenated with an analysis vector comprising an analysis value associated with an asset for each of the plurality assets, the analysis value computed as a ratio of, a difference between a maximum price and a minimum price, and a mean price associated with the past time period;
training a deep-learning neural network to model a probability distribution of the asset-price trends for a future time period using the training data set, wherein the deep-learning neural network receives the time series data as input, the deep-learning neural network automatically learning non-linear dependencies between the plurality of assets, the deep-learning neural network architected to include a first neural network being trained to generate simulated future prices of the plurality of assets and a second neural network being trained to discriminate the simulated future prices from real prices, the first neural network and the second neural network being trained in an adversarial training process, wherein the second neural network is trained to minimize an output value for the real prices and maximize the output value for simulated future prices, while the first neural network is trained to generate the simulated future prices that minimize the second neural network's output value;
executing a portfolio optimization on the modeled probability distribution generated by the trained deep-learning neural network; and
estimating expected risks and returns for different portfolio diversification options based on the portfolio optimization,
wherein the first neural network includes at least consecutive layers that compress an inner representation of the training data set and a sequence of transpose layers that expand the time resolution, wherein at every layer of the transpose layers the time resolution is doubled.

2. The method of claim 1, wherein the training and the portfolio optimization is performed based on parameters, which are configurable.

3. The method of claim 2, wherein at least some of the configurable parameters are received from user input.

4. The method of claim 3, wherein at least some of the configurable parameters are adjustable.

5. The method of claim 1, further comprising causing a graphical user interface to present visualization of at least one of the different portfolio diversification options.

6. A computer program product comprising a computer readable storage medium having program instructions embodied therewith, the program instructions executable by a device to cause the device to:
create a training data set including at least asset-price trends of a plurality of assets over a past time period and a random latent vector sampled from a prior distribution associated with the asset-price trends of a plurality of assets, wherein the training data set includes a time series data, the asset-price trends being normalized, compressed and concatenated with an analysis vector comprising an analysis value associated with an asset for each of the plurality assets, the analysis value computed as a ratio of, a difference between a maximum price and a minimum price, and a mean price associated with the past time period;
train a deep-learning neural network to model a probability distribution of the asset-price trends for a future time period using the training data set, wherein the deep-learning neural network receives the time series data as input, the deep-learning neural network automatically learning non-linear dependencies between the plurality of assets, the deep-learning neural network architected to include a first neural network being trained to generate simulated future prices of the plurality of assets and a second neural network being trained to discriminate the simulated future prices from real prices, the first neural network and the second neural network being trained in an adversarial training process, wherein the second neural network is trained to minimize an output value for the real prices and maximize the output value for simulated future prices, while the first neural network is trained to generate the simulated future prices that minimize the second neural network's output value;

execute a portfolio optimization on the modeled probability distribution generated by the trained deep-learning neural network; and estimate expected risks and returns for different portfolio diversification options based on the portfolio optimization, wherein the first neural network includes at least consecutive layers that compress an inner representation of the training data set and a sequence of transpose layers that expand the time resolution, wherein at every layer of the transpose layers the time resolution is doubled.

7. The computer program product of claim 6, wherein the device is further caused to receive parameters based on which to train and execute the portfolio optimization via a graphical user interface.

8. The computer program product of claim 7, wherein at least some of the parameters are user adjustable.

9. The computer program product of claim 6, wherein the device is further caused to cause a graphical user interface to present a visualization of at least one of the different portfolio diversification options.

10. A system comprising:
a hardware processor;
a memory device coupled with the hardware processor;
the hardware processor operable to at least:
create a training data set including at least asset-price trends of a plurality of assets over a past time period and a random latent vector sampled from a prior distribution associated with the asset-price trends of a plurality of assets, wherein the training data set includes a time series data, the asset-price trends being normalized, compressed and concatenated with an analysis vector comprising an analysis value associated with an asset for each of the plurality assets, the analysis value computed as a ratio of, a difference between a maximum price and a minimum price, and a mean price associated with the past time period;
train a deep-learning neural network to model a probability distribution of the asset-price trends for a future time period using the training data set, wherein the deep-learning neural network receives the time series data as input, the deep-learning neural network automatically learning non-linear dependencies between the plurality of assets, the deep-learning neural network architected to include a first neural network being trained to generate simulated future prices of the plurality of assets and a second neural network being trained to discriminate the simulated future prices from real prices, the first neural network and the second neural network being trained in an adversarial training process, wherein the second neural network is trained to minimize output value for the real prices and maximize the output value for simulated future prices, while the first neural network is trained to generate the simulated future prices that minimize the second neural network's output value;

execute a portfolio optimization on the modeled probability distribution generated by the trained deep-learning neural network; and estimate expected risks and returns for different portfolio diversification options based on the portfolio optimization, wherein the first neural network includes at least consecutive layers that compress an inner representation of the training data set and a sequence of transpose layers that expand the time resolution, wherein at every layer of the transpose layers the time resolution is doubled.

11. The system of claim 10, wherein the consecutive layers compress the inner representation of the asset-price trends of a plurality of assets over the past time period.

12. The system of claim 10, wherein the hardware processor is further operable to receive parameters based on which to train and execute the portfolio optimization via a graphical user interface.

13. The system of claim 12, wherein at least some of the parameters are user adjustable.

14. The system of claim 10, wherein the hardware processor is further operable to cause a graphical user interface to present a visualization of at least one of the different portfolio diversification options.

* * * * *